3,129,178
PROCESS FOR PREPARING MATERIALS HAVING IMPROVED PHYSICAL CHARACTERISTICS
Frederick J. Ihde, Jr., Mountain Lakes, N.J., assignor to Nopco Chemical Company, Newark, N.J., a corporation of New Jersey
No Drawing. Filed May 3, 1961, Ser. No. 107,320
24 Claims. (Cl. 252—21)

This invention relates to a process for preparing siliceous amino compounds. More particularly, this invention relates to a process for preparing siliceous amino compounds using isophthalic acid, terephthalic acid, and the water soluble salts thereof and to the new compositions of matter produced thereby.

United States Patent No. 2,967,828, Ihde, issued January 1961, discloses and claims certain siliceous amino compounds. These materials are prepared by reacting, in an aqueous medium, partial amide salts with water soluble silicate salts in which said silicate salts are present in an amount sufficient to react with all of the acidic components of the partial amide salt. If the silicate salt is present in greater than the aforementioned amount, said amount hereafter being referred to as a stoichiometric amount, then after reaction between the partial amide salt and the silicate salt, the excess silicate salt can be converted to silicon dioxide by treatment with an acid, and the siliceous amino compound is then adsorbed or complexed upon the surface of the silicon dioxide. This silicon dioxide is referred to as free or uncombined silica or colloidal silica. These materials are characterized by a unique and unexpected property, i.e., when added to an oil or other organic material, the resulting mixture demonstrates an increased viscosity at elevated temperatures which surpasses the initial viscosity of the mixture at room temperatures. Also, greases containing same will have lower penetration values at elevated temperatures. Of course, the greater the amount of silicon dioxide present in the composition, the less noticeable will be this property since the silicon dioxide will exert a masking or dilution effect. These siliceous amino compounds after drying and grinding are obtained as white powdery materials, unctuous in texture and having a particle size less than 0.5 micron in diameter. The disclosure in U.S. Patent 2,967,828 is hereby incorporated into the present application by reference.

However, in the preparation in aqueous medium of a siliceous amino compound with a total free and combined silica content of 85% by weight or higher, a number of difficulties were encountered. For instance, excessively slow filtration rates, increased non-porous aggregate formation, and shrinkage of the filter cake during drying were encountered. The dried non-porous aggregates could not be readily reduced to a fine unctuous powder.

These aforementioned difficulties were largely solved, as described in copending application Serial No. 836,086, Ihde, filed August 26, 1959. This latter mentioned application employed a mixture of water and substantially water insoluble organic liquids in the process of preparing a siliceous amino compound. The disclosure in copending application Serial No. 836,086 is hereby incorporated into the present application by reference. Where a non-volatile organic liquid was used, the final product contained the organic liquid which had been adsorbed on, and absorbed in, the siliceous amino compound. The removal of the non-volatile organic liquid from the siliceous amino compound could be accomplished, but only at added expense. The removal of the organic liquid might be desired where the siliceous amino compound was to be used in the fields of gas purification, recovery or removal of organic materials from aqueous systems, de-emulsification of aqueous organic systems, and the like.

Where a volatile organic liquid was used, then the problem of solvent recovery was encountered with the resultant economic loss attendant to loss of solvent.

Patent application Serial No. 86,323, filed February 1, 1961, Ihde et al., and now pending, describes and claims an improved process for preparing these siliceous amino compounds wherein fluosilicic acid or a water soluble fluosilicate salt is used. The use of these fluosilicates or fluosilicic acid enables one to prepare siliceous amino compounds and still overcome the excessively slow filtration rates, increased aggregate formation, and shrinkage of the filter cake during drying, all of which were encountered in preparing the siliceous amino compounds according to the disclosure in U.S. Patent 2,967,828. In addition, the use of fluosilicic acid or/and the fluosilicates resulted in the preparation of siliceous amino compounds of finer particle size with greater oil thickening power than was possible in U.S. Patent 2,967,828. The use of fluosilicic acid or/and the fluosilicates also overcame the problems of solvent loss encountered in patent application Serial No. 836,086, when a volatile organic liquid was used.

It has been found that while the use of fluosilicic acid or/and the fluosilicates was entirely satisfactory and unexpected advance in the art, still it was found that greases prepared using a siliceous amino compound prepared via a process wherein a fluosilicate or/and fluosilicic acid was used suffered from one disadvantage. The disadvantage encountered was that the grease had a tendency to bleed somewhat upon standing. While the amount of bleeding was not excessive, it was realized that if this tendency to bleed could be reduced, the grease which was prepared using a siliceous amino compound would be improved. In addition, the siliceous amino compounds previously prepared, while possessing fine oil thickening properties, did not possess as fine oil thickening properties as was originally expected. This was believed to be due to the compact nature of the siliceous amino particles.

An object of this invention therefore is to prepare siliceous amino compounds for use in a substantially non-bleeding grease.

Yet another object is to provide new siliceous amino compounds having greater oil thickening properties.

Another object is to provide an improved process for preparing siliceous amino compounds, said process not involving excessively slow filtration rates.

Yet another object is to provide a process for preparing siliceous amino compounds whereby aggregate formation of the siliceous amino compound is reduced.

Still another object is to provide a process for preparing siliceous amino compounds wherein a water insoluble organic liquid need not be necessarily used in said process. Other objects and advantages will become apparent from the following more complete description and claims.

It has been unexpectedly discovered that the above and other objects can be successfully achieved by incorporating isophthalic acid, terephthalic acid, as well as water soluble salts thereof in a process for preparing siliceous amino compounds.

Broadly, this invention contemplates, in a process for preparing siliceous amino compounds by reacting (1) a material selected from the class consisting of partial amide salts, amine acid addition salts, imidazoline salts, oxazoline salts and quaternary ammonium salts with (2) a water soluble silicate salt selected from the class consisting of sodium silicates, potassium silicates and ammonium silicates, the step comprising the addition of at least one aromatic acid selected from the class consisting of isophthalic acid, terephthalic acid and water soluble salts thereof.

This invention also contemplates a siliceous amino compound prepared by reacting (1) a material selected from the class consisting of partial amide salts, amine acid addition salts, imidazoline salts, oxazoline salts and quarternary ammonium salts with (2) a water soluble silicate salt selected from the class consisting of sodium silicates, potassium silicates, and ammonium silicates and incorporating in said preparation at least one aromatic acid selected from the class consisting of isophthalic acid, terephthalic acid and water soluble salts thereof and when an aromatic acid is used, converting said aromatic acid to its water soluble salt, and treating said water soluble salt, after formation of said siliceous amino compound, with an acid, thereby precipitating said aromatic acid in and around the siliceous amino compound particles.

PREFERRED EMBODIMENT

This invention is preferably practiced in the following manner.

A silica sol or gel is prepared by dissolving isophthalic acid and sodium silicate in water. When this is done, a portion of the sodium silicate will react with substantially all of the isophthalic acid to form a slurry of water soluble sodium isophthalate and large particles of silica. The formation of large silica particles in this stage of the preparation results in the formation of fine silica particles when the bulk of the sodium silicate is later converted to the gel or the sol.

A solution of magnesium sulfate is then added to the slurry. By the addition of magnesium sulfate to the slurry, the bulk of the sodium isophthalate is converted to magnesium isophthalate. A solution of sodium fluosilicate is then added to the slurry. Sulfuric acid and sodium silicate are slowly added at the same time to the reaction slurry. The slurry is constantly agitated during the addition of these two solutions and care is taken to keep the sulfuric acid in excess at all times so that the slurry remains acid to Congo red paper. Upon rendering the slurry acid, the magnesium isophthalate is converted to a fine voluminous precipitate of isophthalic acid and the sodium silicate solution is converted to silica thereby forming the gel or sol.

A partial amide salt is prepared by dissolving the monoamide of hydrogenated tallow fatty acids and aminoethylethanolamine in Varnish Makers' and Painters' Naphtha. To this clear solution is then added glacial acetic acid thus forming a clear solution of monoamide acetate.

The siliceous amino compound is prepared by adding the partial amide salt solution and sodium silicate to the silica sol or gel. Upon this addition, the isophthalic acid which is present in the gel or sol is converted to its water soluble sodium salt and the siliceous amino compound is formed at the same time. During this addition, the silica sol or gel is agitated and care is taken to keep the partial amide salt solution in excess at all times to minimize heavy gel formation.

The resulting slurry of the siliceous amino compound is digested by allowing it to stand at room temperature. Sulfuric acid is added to the slurry and a sample of the slurry is taken and filtered and sulfuric acid is added to the filtrate in order to determine whether substantially all of the water soluble isophthalic acid salt has been converted to isophthalic acid. If conversion is not complete, then sulfuric acid is again added to the reaction slurry until conversion is complete.

The slurry of the siliceous amino compound is then filtered, washed, dried and ground.

THE USE OF THE AROMATIC ACIDS AND THEIR WATER SOLUBLE SALTS

In preparing the silica sol or gel, a water soluble silicate salt and an aromatic acid are added to water, or a water soluble silicate salt and a water soluble salt of an aromatic acid are dissolved in water. When the aromatic acid is used, it reacts with the silicate salt to form a slurry of silica and the water soluble salt of the aromatic acid, which dissolves. If the water soluble salt is used, a solution is obtained and none of the silicate salt is converted to silica. The use of an aromatic acid here, is preferred because it reacts with the sodium silicate thereby forming a silica substrate. This substrate formation is important because the larger size silica particles thus formed, appear to favorably influence the later formation of small silica particles, when the major portion of the silica sol or gel is formed.

Alternatively, a water soluble salt of the aromatic acid can be formed by reacting a different water soluble salt of the aromatic acid with another compound containing the desired cation, for example, sodium silicate can be added to a water solution of isophthalic acid. The sodium silicate reacts with the isophthalic acid to form water soluble sodium isophthalate. If desired magnesium sulfate, for example, can be reacted with the sodium isophthalate to form water soluble magnesium isophthalate.

The sol or gel is then formed by adding an acid, such as sulfuric acid and additional water soluble silicate salt to the slurry. Care is taken during this addition to keep the acid in excess so that the slurry is at all times acid to Congo red paper. By keeping the slurry acid, a fine voluminous precipitate of the aromatic acid forms from the water soluble salt of the aromatic acid and a gel or sol is also formed. By forming the aromatic acid at this stage of the process, we reduce aggregate formation and influences fine particle formation upon formation of the gel or sol.

Alternatively, the silica gel or sol may be formed without using any aromatic acid or water soluble salt of the aromatic acid.

A water soluble fluosilicate salt or fluosilicic acid, if desired, may be added to the slurry prior to or after the formation of the gel or sol, or it may be added at a later stage in the preparation of the siliceous amino compound.

In preparing the siliceous amino compound, when the siliceous amino compound is formed it must be formed under alkaline conditions if a water soluble aromatic salt is to be present at this stage of the process. By alkaline conditions we means that the pH of the reaction slurry is above 7.0. The water soluble aromatic salt will not form under acid conditions as the substantially water insoluble aromatic acid will precipitate under acid conditions and will remain under these conditions. Under the alkaline conditions employed to form the siliceous amino compound, the aromatic acid, if present at this stage, is converted to its water soluble salt at the same time that the siliceous amino compound is being formed. The reaction slurry is then digested and sulfuric acid or another suitable acid is added to the reaction slurry to bring its pH on the acid side, that is, below 7.0. By adjusting the pH to below 7.0, the water soluble salt of the aromatic acid is converted to a fine voluminous precipitate of the aromatic acid itself and this precipitate forms in and around the siliceous amino compound particles. The siliceous amino compound slurry is then washed and filtered in the usual manner described in the United States patent and co-pending patent applications previously referred to.

If desired, the water soluble salt of the aromatic acid may be added to the reaction slurry after the siliceous amino compound is formed and the process may proceed in the usual manner. That is, the aromatic acid is formed in the presence of the siliceous amino compound. However, the aromatic acid can be formed in the presence of the siliceous amino compound even after the siliceous amino compound has been filtered and washed, and before it is dried. This should be done before drying because once the siliceous amino compound particles and free silica particles, if any, have formed aggregates during drying, it is impractical to attempt to break these aggregates into fine particles. The formation of the aromatic acid after the siliceous amino compound has been washed and filtered and before it has been dried can be accomplished by preparing an aqueous slurry of the siliceous amino compound, adding the aromatic acid thereto, rendering the pH of the slurry alkaline in order to form the water soluble salt of the aromatic acid, and then precipitating the aromatic acid as a fine voluminous precipitate in the presence of the siliceous amino compound by rendering the slurry acid. When the reaction slurry containing the siliceous amino compound is acidified, the water soluble salt of the aromatic acid reacts with the acid and a fine voluminous precipitate is formed which becomes trapped within the siliceous amino compound, and the aromatic acid is absorbed and adsorbed by the siliceous amino compound and free silica, if present and surrounds the siliceous amino and silica particles thus forming a composition according to this invention. When the product is filtered and dried, the trapped precipitate prevents the siliceous amino particles and silica particles if present, from collapsing, and compacting of the particles is thereby prevented. This results in a product which has greater oil thickening power, less shrinkage, and which forms fewer agglomerates during drying. However, it should be understood that the above explanation of the process and composition of our invention is theoretical only and is not to be considered as binding or as limiting the scope of this invention. It is also possible that the aromatic acid itself, for example, isophthalic acid, reacts with any free amino groups which may be present. However, it is not known whether the possible reaction of isophthalic or terephthalic acid with the free amino groups of the interspersion of the isophthalic or terephthalic acid in and around the siliceous amino particles and free silica particles, if present, is responsible for the new and improved composition which we obtain.

It should be noted that prior to converting the water soluble salt of the aromatic acid to the aromatic acid, the salt may be washed out of the reaction slurry. If this is done, then while we obtain an improved product over the products previously obtained, we do not obtain as improved a product as is possible if the aromatic acid is allowed to remain as part of the composition according to this invention.

The aromatic acids and their salts used in the process of this invention and to prepare the compositions of this invention must have a melting point which must be above any of the operating temperatures of the process. The aromatic acids must be substantially water insoluble, while their salts must be water soluble. The water soluble salts must be capable of being decomposed with an acid to form a fine, preferably voluminous precipitate in the presence of the siliceous amino compound. Exemplary of such compounds are zinc terephthalate, magnesium terephthalate, isophthalic acid, terephthalic acid, zinc isophthalate, magnesium isophthalate, sodium terephthalate, potassium isophthalate, barium isophthalate, and the like.

The new compositions prepared according to this invention may have as much as 20 percent of the aromatic acid present based on the total weight of the aromatic acid and the calculated theoretical weight of the siliceous amino compound plus free silica, if any. There is no advantage in having more than 20 percent of the aromatic acid present; however, amounts in excess of 20% of the aromatic acid may be present if desired. We prefer to have no more than 10 percent present, as we have found that amount quite satisfactory.

When an aromatic acid or a water soluble salt thereof is to be used to prepare a siliceous amino compound which does not contain any aromatic acid as part of the composition, then the amount of aromatic acid used may vary up to 20% of the aromatic acid based on the total weight of the aromatic acid used and the theoretical yield of the siliceous amino compound plus free silica, if any. If a water soluble salt of an aromatic acid is used, then an amount can be used which is equivalent to the molar amount of up to 20% of the aromatic acid as aforesaid.

PREPARATION OF A SILICA SOL OR GEL

The preparation of a silica gel or sol while not essential in the preparation of a siliceous amino compound, is preferred because the silica gel or sol acts as a substrate for the siliceous amino compound which is later formed. In this way, a siliceous amino compound of finer particle size can be obtained. When preparing the silica gel or sol, when precipitating the aromatic acid from the water soluble salt and when converting the excess silicate salt remaining after the formation of the siliceous amino compound to silicon dioxide, the use of an acid, such as sulfuric acid, converts the silicate solution to colloidal silica in the form of a gel or sol. In addition, if an aromatic acid, such as terephthalic acid, or a water soluble salt of an aromatic acid is used when preparing the silica gel or sol, the use of the acid such as sulfuric acid, precipitates the aromatic acid from its water soluble salt and the aromatic acid influences the formation of fine silica particles. It will be remembered that whether a water soluble salt of an aromatic acid or the aromatic acid itself is used, the water soluble salt of the aromatic acid is present shortly before an acid such as sulfuric acid, is added. The acids which may be used to convert the silicate salt to colloidal silica as a gel or sol and to precipitate the aromatic acid from its water soluble salt are aliphatic carboxylic acids containing up to about 6 carbon atoms and dicarboxylic acids, and preferably mineral acids. Thus, acids such as acetic acid, propionic acid, butyric acid, caproic acid, oxalic acid, hydrochloric acid, phosphoric acid and sulfuric acid are especially well suited for such use. However it will be apparent to those skilled in the art that the invention need not be limited solely to the use of these specific acids heretofore named.

When the solution of the acid is added to the solution of the water soluble or water dispersible silicate and the water soluble salt of the aromatic acid, the acid solution should always be kept in excess to assure that the aromatic acid will be formed from its water soluble salt and will influence the silica particles of the silica gel or sol towards fine particle formation and that silicon dioxide will not excessively polymerize. It is well known that silicon dioxide polymerizes less in an acid system than in an alkaline system.

In addition, additives may be used to inhibit polymerization and thus reduce the size of the silica particles, or, if desired, to accelerate polymerization of silica in order to build up the silica particle size. For example, sodium chromate and the like may be added to the solution of the water soluble or water dispersible silicate as a polymerization inhibitor, and sodium molybdate and the like may be added as a polymerization accelerator. If desired sodium chloride and the like may be used to keep the silica gel fluid. A water soluble fluosilicate salt or fluosilicic acid may also be added to the silica gel to influence fine particle formation. While the addition of such salts or acids is preferred, it is not essential and may be omitted. These as well as other additives not specifically mentioned herein are known in the art and the present invention should not be construed to be limited to such features.

The process of this invention is preferably practiced using one or more of the fluosilicates or fluosilicic acid, as previously described, in conjunction with the aromatic acid or its water soluble salt, and as a result, a much more improved produced is thereby obtained. However, the process of this invention is operable without the use of a fluosilicate or fluosilicic acid and outstanding products are still obtained.

The fluosilicate or fluosilicic acid if used, should be present either before or during the formation of the siliceous amino compound. If it is present only after the siliceous amino compound is formed, it has been found that there is not a great enough improvement in the siliceous amino compound product to make this addition economically feasible.

In the process of this invention, we may use fluosilicic acid and water soluble fluosilicates such as sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate, and the like. Fluosilicic acid and fluosilicates and their use are described in copending application Serial No. 86,323, filed February 1, 1961. That description is hereby incorporated in the present invention by reference.

The fluosilicic acid or fluosilicate, if used, can be present in amounts of up to about 10 percent of fluosilicic acid or fluosilicate based on the total weight of, fluosilicic acid or fluosilicate, free silica, if any, and the theoretical yield of the siliceous amino compound without the aromatic acid. We have found that if it is present in amounts of more than about 10 percent, then there is not a sufficient improvement in the siliceous amino compound in relation to the amount of fluosilicic acid or fluosilicate used, to make our process economically feasible, however, amounts in excess of 10 percent may be used if desired.

If fluosilicic acid or a fluosilicate is to be used, we prefer to use 5 percent of fluosilicic acid or fluosilicate because we have found that the product is a steadily improved one as the amount of additive is increased to 5% whereupon optimum improvement is obtained. When the additive is used in amounts above 5%, we still obtain an improved product, but it is not as improved a product as when 5% is used. As the amount of fluosilicic acid or fluosilicate increases from 5% to 10%, the product remains improved in comparison with a product prepared by a process wherein no fluosilicic acid or fluosilicate was added; however, as the amount of additive used increases from 5% to 10%, the product becomes increasingly less improved as compared to a product prepared by a process utilizing 5%. The silicate salts employed in preparing a silica gel or sol, and in the reaction with the partial amide salt, oxazoline salt, or other salt as will be discussed later, can be any of the various forms of sodium silicate, potassium silicate and ammonium silicate which are water soluble or substantially water soluble. Examples of useful silicate salts are sodium metasilicate, ($Na_2O:SiO_2$), sodium orthosilicate ($2Na_2O:SiO_2$), or any other water-soluble sodium silicate, such as, sodium silicate having the composition $Na_2O:4SiO_2$, can be used; potassium silicate ($K_2O:SiO_2$) and ($K_2O:3.91SiO_2$), potassium tetrasilicate ($K_2O:4SiO_2.H_2O$) or any other water-soluble potassium silicate. The preferred products, however, are produced by reacting the partial amide salt with sodium silicate having the composition $Na_2O:3.22SiO_2$. Water soluble or substantially water-soluble silicate salts are well known in the art and the invention is not to be construed as limited to the silicate salts disclosed above.

If desired, when preparing the silica gel or sol and when preparing the siliceous amino compound, the slurry may be heated. Heating helps build up the particle size or/and porous aggregate particle formation. While we may use temperatures ranging from the freezing point of the system used, up to the boiling point of the system used, and periods of digestion ranging from no digestion at all up to any digestion period desired. We prefer to utilize temperatures of from 20° C. to 95° C. and digestion periods of from 20 to 72 hours. However, it has been found that these ranges give us a desirable silica particle. The above temperatures and periods of digestion as aforesaid, may also be used in the preparation of the siliceous amino compound. However, it should be understood that temperature and time of digestion may be varied by one skilled in the art and still be within the scope of this invention.

An organic water insoluble liquid may be used in preparing the silica gel as well as in preparing the siliceous amino compound. When the organic water insoluble liquid is used, it should be present no later than when the siliceous amino compound is formed in order to assure optimum benefit from its use. Any organic liquid which is water insoluble or substantially water insoluble can be used in preparing the siliceous amino compounds as is disclosed in patent application Serial No. 836,086, filed August 26, 1959. This disclosure is hereby incorporated by reference in the present application. Generally speaking, if an organic liquid is to be used, it should be present before or during the formation of the siliceous amino compound because it has been found that when it is so present, it favorably influences the fine particle formation of the siliceous amino compounds and free silica, if any. The organic liquid can be one of many materials so long as it has the property of being a water insoluble or substantially water insoluble, inert organic liquid. The wide selection of liquid organic materials which can be used herein is attributable to the very high capacity of the siliceous amino compounds for adsorbing organic liquids. A partial list which is exemplary of suitable organic liquids which are water-insoluble or substantially water-insoluble is as follows: aliphatic monohydroxy alcohols such as n-butanol, hexanol, heptanol; ketones such as dibenzyl ketone and methyl isobutyl ketone, aldehydes such as caproaldehyde and capricaldehyde; hydrocarbons such as benzene, xylene, toluene, tetralin, cyclohexane, decalin, kerosene, naphtha, Varsol, and other mixtures of hydrocarbons having variable boiling ranges depending upon their specific constituents; halogenated hydrocarbons such as perchloroethylene, ethylene dichloride, carbon tetrachloride, and butyl chloride; animal, vegetable and fish oils such as tallow, peanut, coconut, herring, sardine, and linseed oils; esters such as methyloleate, dioctylphthalate, dioctyl sebacate, tributyl phosphate, tricresyl phosphate and dibutyl carbonate; silicones such as methyl polysiloxane; phenols such as nonylphenol, dicotylphenol and said phenols condensed with up to 2 moles of ethylene oxide; water insoluble polyoxyalkylene glycols and derivatives thereof such as the water insoluble "Ucons"; glycol ethers such as ethylbutyl "Cellosolve" and phenyl "Cellosolve," acetals such as dichloroethyl formal; fluocarbons such as $C_5$ fluoalcohols; ethers such as butyl ether and dichloroethyl ether; mercaptans such as butyl mercaptan and thiocresol; pyridine borane, tributyl borane and the like. Also, materials which are solids at room temperature but which can be liquified under our operating temperatures, can be used, e.g. eicosane, and paraffin wax.

It should be understood that the use of these organic liquids is optional. That is, our invention brings about the improved results even when such liquids are not used.

PREPARATION OF THE SILICEOUS AMINO COMPOUND

Generally speaking, in the preparation of the siliceous amino compounds, any water soluble or water dispersible partial amide salt can be used to react with the water soluble silicates. A large number of these salts which can be used and the method of their use are disclosed in U.S. Patent No. 2,967,828, Ihde, issued January 10, 1961. The disclosures of the above identified patent pertaining to the partial amide salts and their use in preparing a siliceous amino compound are hereby incorporated by reference in the present application. Among the partial amide salts which can be used are the following; the acetate salt of a monoamide, said monoamide having been prepared by reacting tetraethylene pentamine with hydrogenated tallow fatty acids, the acetate salt of the monoamide of behenic acid and diethylene triamine, the phosphoric acid salt of the monoamide resulting from the reaction of dichlorostearic acid with diethylene triamine, and the like. The preparation of partial amide salts in general, and other partial amide salts not specifically mentioned herein, are well known in the art and hence the present invention is not to be construed as limited to the partial amide salts enumerated above, or to any specific method of preparation of partial amide salts.

Any water soluble or water dispersible amine acid addition salt or quaternary ammonium salt can also be used in reaction with the water soluble silicate salts to form the siliceous amino compound. A number of amines which can be used to form the amine acid addition salts are disclosed in patent application Serial No. 836,086, filed August 26, 1959. Among the primary, secondary, and tertiary amines which may be used to form the acid addition salts are "Primene JM–T," which is a tertiary alkyl primary amine obtainable from Rohm and Haas Co., lauryl amine, dioctyl amine, stearylamine, tricapryl amine, methyl lauryl amine, dimethyl soya amine, diphenylamine, aniline, dimethyl aniline, dibenzylamine, β-phenylethylamine, triethyl amine, methylethylisobutylamine, diisopropylamine and the like. The amine acid addition salts can be formed by treating the amine with an acid in any known conventional manner. The manner of forming the amine acid addition salts and their use in preparing a siliceous amino compound is described in patent application Serial No. 836,086, filed August 26, 1959. This disclosure is hereby incorporated in the present application by reference. However, the present invention is not to be construed as limited to any particular mode of preparation of the amine acid addition salts or to the particular amine acid addition salts heretofore disclosed, as amine acid addition salts and their preparation are well known in the art.

Examples of the quaternary ammonium salts which can be used in preparing the siliceous amino compounds according to the process of this invention are described in copending patent application Serial No. 836,086, filed August 26, 1959. Other quaternary ammonium salts are well known in the art and may also be used even though not specifically mentioned herein. Thus the invention is not to be construed as limited to the quaternary ammonium salts hereafter disclosed. Among the quaternary ammonium salts which may be used are dimethyl dioctadecyl ammonium chloride, trimethyl soya ammonium chloride, trimethyl tallow ammonium chloride, dimethyl dicoco ammonium chloride, tetraethylammonium iodide, and the like. The manner of using the quaternary ammonium salts in preparing siliceous amino compounds are disclosed in U.S. patent application Serial No. 836,086, filed August 26, 1959, and now pending. This disclosure is hereby incorporated by reference in the present application.

In addition, oxazoline salts and imidazoline salts or mixtures thereof can also be used to react with the water soluble silicates in preparing the siliceous amino compounds according to the process of this invention. Oxazoline and imidazoline salts are well known in the art and the invention is not to be construed as limited to the oxazoline and imidazoline salts described below. Among the imidazoline and oxazoline salts which may be used are the salt of the imidazoline of two moles of stearic acid and one mole of diethylenetriamine, the salt of the oxazoline of one mole of monoethanolamine and one mole of lauric acid, and the like. Among the acids which may be used to form the salts of the imidazolines and oxazolines are, phosphoric acid, acetic acid, hydrochloric acid, sulfuric acid, and the like, and where an organic solvent is used, butyric acid, propionic acid, and the like may also be used. However, it will be apparent to those skilled in the art that the invention need not be limited solely to the use of these specific acids heretofore named.

The partial amide salt as well as the other salts, such as a quaternary ammonium salt, etc., is formed in a separate vessel and also another aqueous solution of the water soluble or water dispersible silicate is prepared separately. These two solutions are then added, at the same time, to the silica gel or sol, if used, thus preparing a siliceous amino compound.

If an aromatic acid or a water soluble salt of an aromatic acid has not been used in preparing a silica gel or sol, if prepared, it may be added when preparing the partial amide salt, quaternary ammonium salt, or other salt. The aromatic acid can even be substituted for the acid used to convert the monoamide, amine, etc. to the desired salt. By using the aromatic acid in place of another acid such as acetic acid, the partial amide isophthalate or terephthalate salt or amine isophthalate or terephthalate salt, etc. would be formed. This can then be reacted with a silicate salt to form the siliceous amino compound and the water soluble salt of the aromatic acid.

Alternatively, a water soluble salt of the aromatic acid may be used together with the acid normally used to convert the monoamide, amine, etc. to the salt. By so using the water soluble salt, one or both of two reactions occur. It is possible that the acid will convert the water soluble salt to the aromatic acid which would then react with the monoamide. Or, it may be that the acid normally used to convert the monoamide, etc. will react with the monoamide, etc. or it may be that both acids react, to some extent, with the monoamide, amine, etc. Whichever direction, or directions these reactions take is not essential because a partial amide salt, amine acid addition salt, etc. is formed and the siliceous amino compound is readily formed by reacting the partial amide or other salt with a silicate salt.

The partial amide salt, or other salt, need not be necessarily prepared in an aqueous medium. If desired, a water insoluble organic solvent, such as Varnish Makers' and Painters' Naphtha can be used as a solvent for the partial amide salt or other salt. If a solvent is used, and an aromatic acid or its water soluble salt is also used, it is immaterial whether the aromatic acid or its salt is soluble as the water soluble salt of the aromatic acid will be formed when the siliceous amino compound is formed.

When the siliceous amino compound is prepared, it is in the form of a slurry. The pH of this slurry should be rendered alkaline up to a pH of 9.5, if it is not yet alkaline, to avoid the premature precipitation under acid conditions, of the aromatic acid, if the water soluble salt of the aromatic acid is present at this stage of the process. If the water soluble salt of the aromatic acid is not yet present, then the pH of the slurry may be as low as 6.5. If the pH of the slurry is below 6.5 and no aromatic acid is present, then the siliceous amino compound may be decomposed. At a pH of above 9.5, maximum oil absorption by the product of a water insoluble organic liquid, if used, is not obtained.

Where a water soluble salt of an aromatic acid is present, and it is desired to precipitate the aromatic acid therefrom, then the pH of the slurry can be as low as 3.0 in some instances. It has been found that for some unexplainable reason, when the aromatic acid is present, the pH of the slurry can be as low as 3.0 in some instances, or even lower, without risking decomposition of the siliceous amino compound.

In order to precipitate substantially all of the aromatic acid from its water soluble salt, the following is done. A sample of the slurry is taken and filtered. To the filtrate is then added a suitable acid. If no precipitate forms, precipitation is complete. If a precipitate forms, then more acid is added to the slurry and the procedure is repeated until no precipitate is obtained upon addition of an acid to the filtrate from a sample of the slurry.

The water insoluble organic liquid which can be used are those previously mentioned, and need not be further discussed. The water insoluble organic liquid however, can be added at any stage of the process and even after the siliceous amino compound is formed, although it is preferably added before or simultaneously with formation of the siliceous amino compound. If the organic liquid is added after both the silica and siliceous amino compound are formed, it will aid filtration and reduce aggregate formation during drying even though it has been added at a time after which it favorably influences fine particle formation.

The precise nature of the reaction of the silicate salt and the salt of the partial amide as well as the other salts, such as the amine acid addition salts, etc. is not known. It is believed that the sodium, potassium or ammonium ions of the silicate salt form a salt with the acid radicals of the partial amide salt and that the silica portion of the silicate salt combines with the amino nitrogen atoms of the partial amide reactant to produce the siliceous amino compound. However, the above theory should not be construed as limiting the scope of the invention.

In producing the siliceous amino compound, the silicate salt is employed in quantities which are at least stoichiometrically equivalent to the quantity of partial amide salt or of another salt, such as an imidazoline salt, etc., with which it is to be reacted. For the purpose of this invention, a stoichiometrically equivalent quantiy is that quantity of silicate salt which will provide sufficient sodium, potassium or ammonium ions to neutralize all of the acid radicals of the partial amide salt or other salt, such as an oxazoline salt, etc.

The preferred products of the invention are, however, produced by using quantities of silicate salt in excess of the stoichiometrically equivalent amount. The excess silicate salt is thne converted with acid to silicon dioxide and the water-soluble sodium, potassium, or ammonium salt of the acid. This silicon dioxide is also referred to as collodial silica and includes silica gel, silicic acid, or hydrated silica. When, in the practice of this invention, excess silicate salt is employed, the silicon dioxide which is produced, when and if the reaction mixture is subsequently treated with acid, becomes dispersed in the reaction mixture. The siliceous amino product resulting from the reaction of the silicate salt and the partial amide salt is adsorbed on the silicon dioxide or complexed therewith. The water-soluble sodium, potassium, or ammonium salt of the acid which is produced as the incidental reaction product of this acid-treating step is soluble in the aqueous portion of the reaction medium and is removed from the water-insoluble product of the invention when the product is separated from the reaction medium as for example by filtering and washing.

In this embodiment, the combined silica is present in the final product in an amount so that it plus the uncombined silica comprises up to 95% by weight of the final product, based upon the total weight of partial amide or quaternary ammonium compound, etc., combined and uncombined silica. In preparing this embodiment, the partial amide salt or other salts, such as the amine acid addition salt, etc., and a stoichiometrically equivalent amount of silicate solution can be added simultaneously to a solution already containing colloidal silica such as silica gel, silica sol or pyrogenic silica. Another variant is to add the partial amide salt or other salt such as an oxazoline salt, etc., to a silicate solution in which a portion of the silicate salt has been converted to a gel or sol and the remaining unconverted silicate salt is stoichiometrically equivalent to the amount of partial amide salt or other salt, such as an oxazoline salt, etc., which is introduced. Also, if desired, the partial amide salt or other salt such as the quaternary ammonium salt, etc. can be introduced into water with agitation, simultaneously with a stoichiometric excess of soluble silicate and sufficient acid to convert the excess silicate to the free silica. Another procedure is to introduce the partial amide salt or other salt such as an amine acid additon salt, etc., plus excess silicate salt into a solution of a gel or sol which was prepared under acid conditions and thereby contains the aromatic acid and the acid necessary to convert the excess silicate salt to silica. Thus, it can be seen that the uncombined silica can be introduced before, during or after the formation of the siliceous amino compound.

The preparation of these siliceous amino compounds can be carried out under atmospheric pressure using a wide range of temperatures, i.e., from just above the freezing point of the highest freezing component to just below the boiling point of the lowest boiling component or azeotrope if a water organic liquid mixture is used. If a non-volatile organic liquid is used, the maximum temperature should be the boiling point of the water present which would be the lowest boiling component. The higher temperatures, e.g. of the order of 75° C. are preferred in order to obtain uniform distribution of the siliceous amino compound. That is, under the higher temperatures if any of the partial amide or other compounds such as a quaternary ammonium compound, etc., should precipitate out as large particles, gummy masses, or small lumps, it will readily redisperse. If desired, the preparation can be carried out at superatmospheric pressures by using an autoclave. In such instances, of course, the temperatures are not limited to the boiling point of the lowest boiling component or azeotrope of the water-organic liquid mixture, if such a mixture is used.

Other variations in the process are as follows. The amount of water which is used may be varied widely. Enough should be used, however, to keep the system containing the siliceous amino compound in the form of an easily mixable slurry. As pointed out previously, the partial amide salt, or other salts as aforementioned can be prepared in the absence of water and the silicate salts which are reacted with the partial amide salts or other salts such as amine acid addition salts, quaternary ammonium salts, oxazoline salts and imidazoline salts, can be introduced as solid materials. The washing of the filter cake comprising the siliceous amino compound and free silica, if present, can be either batchwise or continuous and if the aromatic acid has not been precipitated, then the water soluble salt of the aromatic acid is washed out. Or, if the siliceous amino compound, free silica, if present, and inert water insoluble organic liquid, if used, separate from the water layer, then the water layer can be decanted or removed in any other suitable manner without filtering the slurry at any stage of the recovery of the siliceous amino compound and free silica, if present. After the final washing, the filter cake, or siliceous amino compound layer and free silica, if present, if filtration has not been used, can be slurried and milled, e.g., using a ball mill, roll mill, colloid mill or homogenizer to reduce the particle size. The drying methods can vary, i.e., tray drying, vacuum drying, spray drying or drying while grinding can be used. After drying, mills such as a hammer mill, jet mill, attrition mill can be used to reduce the siliceous material. Moreover, if a fine silica, free from organic material is desired, the siliceous amino compound, whether or not it contains uncombined silica, can be ignited before or after drying. Finally, the product can be irradiated, e.g., by exposure to gamma (cobalt 60 source) or neutron (nuclear reactor) irradiation prior to grinding in order to aid the formation of fine particles.

Also, if a volatile organic liquid is used, it can be removed at any point after the product, in the form of its filter cake, is collected. Such product is referred to as an unoiled siliceous amino compound. Removal can be done during the drying, by flash evaporation or by stepwise replacement with more volatile organic solvents. When a non-volatile organic liquid is used, the final product is referred to as an oiled siliceous amino compound.

It of course, should be realized, that regardless of the procedures utilized in preparing the siliceous amino compounds such as those set forth above, the aromatic acid or water soluble salt thereof can be added at any stage, prior to, simultaneously with, or after, the formation of the siliceous amino compound. When a fluosilicate or fluosilicic acid is also used, it should be present at least when the siliceous amino compound is formed.

The silica portion of the silicate salt which is utilized in the formation of the siliceous amino compound is referred to as combined silica. Any excess silicate salt which is converted to silicon dioxide is referred to as free or uncombined silica or colloidal silica.

Whenever percent shrinkage of the filter cake is given, these values are percent by volume. Wherever penetration values are set forth, the procedure, A.S.T.M. cone penetration D–217–52T was used. Wherever the grease was worked prior to penetration determinations, this was done by a motor driven grease worker described in A.S.T.M. D217–52T. Whenever the Saybolt Universal viscosimeter was used in determining viscosity, it was used according to A.S.T.M. D88–38.

Wherever bulking values are given, these values were determined by placing a ground ten gram sample of the siliceous amino compound and free silica, if any, in a 100 cc. graduated cylinder and measuring and recording the volume this ten gram sample occupied. If the volume of the ten gram sample exceeds 100 cc., then a smaller sample is used, ten is divided by the size of the sample, and the bulking value is multiplied by the quotient in order to obtain the bulking value of a ten gram sample. The graduated cylinder is then tapped sixty times on a hard surface, and the volume which the ten gram sample occupied after tapping is recorded. Where bulking values are given, the first number is the volume the ten gram sample occupied before tapping and the second number is the volume the ten gram sample occupied after tapping. Generally speaking, the higher the pair of bulking values, the finer the particle size of the siliceous amino compound and free silica, if any, obtained. When the bulking values of oiled products are determined, they will at first appear low. This is because, as is well known, oil decreases the bulking values of fine powders. Therefore, oiled products should only be compared with other oiled products.

Where penetration values are given, unless otherwise indicated, the grease was composed of 10% siliceous amino compound and 90% oil, based on the total weight of the grease. It should be noted that the lower the penetration value is, the harder the grease is. Also, the harder the grease, in greases containing an equal percentage of siliceous amino compound and free silicas if present, the finer the particles are, and/or the more porous are the particle aggregates. Note that the greater the porosity, the greater is the surface area of the aggregates.

Reference will be made in the examples to filtration rates. Generally speaking, the faster the rate of filtration, the finer the particles are and/or the more porous and the larger is the surface area of the particle aggregates.

Reference in the examples is also made to shrinkage of the filter cake after drying. As a general rule, the less the amount of shrinkage after drying, the more porous and finer is the siliceous amino particle and free silica particle, if present.

In order to more fully illustrate the nature of this invention and the manner of practicing the same, the following examples are presented.

*Example I*

The purpose of this example is to illustrate the preparation of a siliceous amino compound using a solvent for the partial amide and partial amide salt.

(A) PREPARATION OF THE SILICA SOL 3.0 lbs. of isophthalic acid and 14 lbs. 6 oz. of a 40° Bé. sodium silicate ($Na_2O:3.22SiO_2$) solution were dissolved in 240 lbs. of water. The resultant clear sodium isophthalate solution was diluted by the addition of 170 lbs. of water thereto. The solution was then agitated while heating to a temperature of 80° C. and diluted with 220 lbs. of water.

A magnesium sulfate solution containing 2 lbs. 14 oz. of magnesium sulfate ($MgSO_4.7H_2O$) dissolved in 15 lbs. of water was slowly added to the solution containing sodium isophthalate. A cloudy slurry formed. The slurry was allowed to cool to 50° C. whereupon 1.5 lbs. of sodium fluosilicate was dissolved therein. The slurry was then cooled to 40° C.

A diluted sulfuric acid solution prepared by adding 9 lbs. 2 oz. of 96% sulfuric acid to 52 lbs. of water was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated with agitation to 55° C.

(B) PREPARATION OF THE PARTIAL AMIDE SALT 3.0 lbs. of the monoamide of hydrogenated tallow fatty acids and aminoethylethanolamine was dissolved in 60 lbs. of Varnish Makers' and Painters' Naphtha at a temperature of from 80° C. to 85° C. To this clear solution was then added 382 grams of glacial acetic acid thus forming a clear solution of monoamide acetate.

(C) PREPARATION OF THE SILICEOUS AMINO COMPOUND

The partial amide salt solution prepared above in part B and a sodium silicate dilution prepared by diluting 36 lbs. 9 oz. of a 40° Bé. sodium silicate ($Na_2O:3.22SiO_2$) solution with 40 lbs. of water, were slowly added at the same time to the silica sol of part A. When the partial amide salt solution and the sodium silicate dilution were added to the silica sol, the water soluble sodium salt of isophthalic acid formed from the aromatic acid present in the silica sol and dissolved, and the siliceous amino compound was formed at the same time. During this addition, the silica sol was agitated and care was taken to keep the partial amide salt solution in excess at all times to minimize heavy gel formation. The temperature of the slurry was maintained during the addition between 61° C. and 64° C. The filtrate from a filtered sample of the slurry had a pH of 7.5.

The slurry was digested by allowing it to stand for eighteen hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% sulfuric acid to this filtrate, a slight white haze developed indicating that practically all of the water soluble isophthalate salt had been converted to the substantially insoluble isophthalic acid.

(D) RECOVERY OF THE SILICEOUS AMINO COMPOUND

The slurry was heated with agitation to a temperature of 70° C. and filtered. The filter cake was washed four times, each time adding 700 lbs. of water, agitating the slurry, and filtering. The washed filter cake was dried at a temperature of 165° F. and ground in a Metals Disintegrating Company Micro-Pulverizer through a 1/64" screen. A yield of 28 lbs. of a finely ground material was obtained. The bulking value of a 10 gram sample was 280 cc./256 cc.

A grease composed of 11% of the siliceous amino compound and 89% of a 320 second Saybolt viscosity naphthenic base oil and prepared by simple mixing had a grease penetration value of 255.

Example II

(A) PREPARATION OF THE SILICA SOL 3.75 lbs. of isophthalic acid and 18 lbs. of a 40° Bé. sodium silicate ($Na_2O:3.22SiO_2$) solution were added to 300 lbs. of water with agitation until a clear solution was obtained. The clear solution was diluted with 360 lbs. of water and heated with agitation to 80° C.

3 lbs. 10 oz. of magnesium sulfate ($MgSO_4.7H_2O$) was dissolved in 14.5 lbs. of water and was added to the clear solution. A cloudy slurry containing water soluble magnesium isophthalate formed. The cloudy slurry was allowed to cool to 55° C. whereupon 855 grams of sodium fluosilicate was dissolved therein and the cloudy slurry allowed to cool to between 30° C. and 35° C.

57 lbs. of a 40° Bé. sodium silicate ($Na_2O:3.22SiO_2$) solution diluted with 57 lbs. of water and 11 lbs. 3 oz. of 98% sulfuric acid diluted with 68 lbs. of water were added, at the same time, to the cloudy slurry. During this addition, the cloudy slurry was agitated and care was taken to keep the acid in excess at all times so that the agitated slurry was acid to Congo red paper at all times.

When the acid and sodium silicate solutions were added to the cloudy slurry, the magnesium isophthalate was converted to a fine voluminous precipitate of isophthalic acid thus forming a milky slurry.

The slurry was agitated while heating to 55° C.

(B) PREPARATION OF THE PARTIAL AMIDE SALT 3.75 lbs. of the monoamide of hydrogenated tallow fatty acids and aminoethylethanolamine was dissolved in 37.5 lbs. of a 320 second Saybolt viscosity naphthenic base oil at 75°–80° C.

1.05 lbs. of glacial acetic acid was added to the solution of the monoamide while stirring said solution. 35 lbs. of water at a temperature of 85° C. to 90° C. was added to the solution containing the resultant monoamide acetate salt thereby emulsifying the monoamide acetate salt solution.

(C) PREPARATION OF THE SILICEOUS AMINO COMPOUND

The monoamide acetate salt emulsion and 45 lbs. 12 oz. of a 40° Bé. sodium silicate ($Na_2O:3.22SiO_2$) solution diluted with 45 lbs. 12 oz. of water were added to the silica sol of preparation A. During the addition, the silica sol was agitated and the monoamide acetate emulsion was always kept in excess. The temperature of the silica sol was allowed to rise during the addition to between 60° C. and 63° C.

100 lbs. of water was added to the agitated slurry to decrease the viscosity and increase the rate of agitation. The filtrate taken from a small sample of the reaction slurry had a pH of 8.2. 250 grams of 98% sulfuric acid was diluted with water to a 10% sulfuric acid solution. This was added to the reaction slurry. A sample of the reaction slurry was taken and filtered and the pH of the filtrate was 7.55. The reaction slurry was digested by allowing it to stand for 17.5 hours.

3 pounds 11 ounces of 98% sulfuric acid was diluted with 32 pounds of water and was added to the reaction slurry. Upon this last addition of sulfuric acid, a fine voluminous white precipitate of isophthalic acid formed. The filtrate from a small sample of the reaction slurry now had a pH of 3.85. Upon the addition of 10% sulfuric acid to this filtrate sample, a slight haze formed, indicating that substantially all of the isophthalic acid had been precipitated.

(D) RECOVERY OF THE SILICEOUS AMINO COMPOUND

The reaction slurry was heated to a temperature of between 75° C. and 80° C. and was filtered.

The filter cake was washed three times, each time adding 750 pounds of water, agitating the slurry, and filtering. The washed filter cake was dried at a temperature of from 150° F. to 160° F. and was ground in a Metals Disintegrating Company Micro-Pulverizer through a $\frac{1}{32}''$ screen.

A grease composed of 7.5% of the siliceous amino compound and free silica, 7.5% of a 320 second Saybolt viscosity naphthenic base oil, and 85% of a 1060 second Saybolt viscosity paraffin base oil was homogenized in a Manton Gaulin Model 100–K–3–8RA homogenizer at 8,000 p.s.i. The grease penetration value was 310. The grease was worked 500 times at room temperature to determine mechanical stability. The grease penetration after 500 workings was 330. In addition, a sample of the grease was worked 60 times at a temperature of between 105° C. to 110° C. The grease penetration was 370. This grease was allowed to cool to 78° F. and was worked an additional 500 times. Grease penetration after this last 500 workings was 340.

Water sensitivity of the grease was determined by adding 10% water, by weight of the grease, to each grease and working the grease 500 times. The grease penetration value after 500 workings where 10% water was present was 340. As can be readily seen, the watered grease remained stable, and the water did not cause the grease to soften and liquify.

Bulking value of the product was 100 cc./80 cc. for a 10 gram sample.

Example III

The purpose of this example is to illustrate a procedure wherein the water soluble salt of the aromatic acid is washed out without precipitating the aromatic acid.

(A) PREPARATION OF THE SILICA SOL 3 lbs. 12 ozs. of isophthalic acid, 150 lbs. of water, and 18 lbs. of a 40° Bé. sodium silicate ($Na_2O:3.22SiO_2$) solution diluted with 18 lbs. of water were mixed together. The slurry was agitated while heating to 80° C. and 150 lbs. of water was added thereto.

3 lbs. 10 ozs. of magnesium sulfate ($MgSO_47H_2O$) was dissolved in 14.5 pounds of water and added to the slurry which was then diluted by the addition of 360 lbs. of water thereto.

The silica sol was then prepared in the manner of Example II.

(B) PREPARATION OF THE PARTIAL AMIDE SALT

The partial amide salt was prepared as in Example II.

(C) PREPARATION OF THE SILICEOUS AMINO COMPOUND

The siliceous amino compound was prepared in the manner of Example II except that 75 lbs. of water was added to decrease the viscosity of the siliceous amino compound slurry and increase the rate of agitation of the slurry.

The filtrate from a sample of the reaction slurry had a pH of 6.9. At this pH of 6.9 some isophthalic acid was present as a fine voluminous precipitate.

2 lbs. of sodium hydroxide dissolved in 2 lbs. of water was added to the siliceous amino compound slurry. A sample of the slurry was filtered and the filtrate had a pH of 7.45.

When the sodium hydroxide was added to the siliceous amino compound slurry, the isophthalic acid reacted with the sodium hydroxide to form the water soluble sodium isophthalate which dissolved in the reaction slurry.

The slurry was digested for 17 hours by allowing it to stand.

(D) RECOVERY OF THE SILICEOUS AMINO COMPOUND

The slurry was filtered, and washed four times with water in the manner of Example II.

By filtering the slurry and washing with water while the slurry had an alkaline pH, the water soluble salt of isophthalic acid was removed from the slurry and the siliceous amino compound did not contain any aromatic acid or any water soluble salt of the aromatic acid.

The filter cake was dried at a temperature of between 150° F. to 155° F. and was ground in a Metals Disintegrating Company Micro-Pulverizer.

The bulking value of the product was 88 cc./76 cc. for a 10 gram sample. A grease composed of 10% of the siliceous amino compound and free silica, 10% of a 320 second Saybolt viscosity naphthenic base oil and 80% of a 1060 second Saybolt viscosity paraffin base oil was prepared. The grease was homogenized in a Manton Gaulin Model 100–K–3–8RA homogenized at 8,000 p.s.i. The grease penetration value was 352. The grease was worked 60 times at a temperature of 105° C. to 110° C. The grease penetration value after working was 375. After the grease cooled to room temperature, it was worked an additional 500 times and the grease penetration value was 350.

10% water, by weight of the grease, was added to the grease and the grease was worked 500 times. The grease penetration value of the watered grease was 360. As can be readily seen, the grease remained stable and the water did not cause the grease to soften and liquify.

*Example IV*

The purpose of this example is to illustrate the preparation of a siliceous amino compound wherein the aromatic acid was not precipitated and the water soluble salt of the aromatic acid was washed out of the preparation.

(A) PREPARATION OF THE SILICA GEL

Isophthalic acid, 12.5 grams, and 60 grams of a 40° Bé. sodium silicate solution ($Na_2O:3.22SiO_2$) were added to 500 cc. of water. This was heated with agitation to 80° C. and silica gel substrate particles formed, at which time an additional 500 cc. of water was added. Magnesium sulfate, 12.0 grams were dissolved in 48 cc. of water at 30° C. The magnesium sulfate solution was then added dropwise to the silica gel which was at a temperature of 80° C. To this entire mixture was then added 1200 cc. of water, and 6.25 grams of sodium fluosilicate were then dissolved therein. Sodium silicate ($Na_2O:3.22SiO_2$), 190 grams of a 40° Bé. solution, was added to 190 cc. of water. Sulfuric acid, 38 grams of a 96% acid, were added to 215 cc. of water. The sodium silicate solution and the sulfuric acid solution were heated to a temperature of from 40° C. to 42° C. and added, at the same time, to the silica gel previously prepared. Care was taken during the addition to keep the acid in excess at all times so that the reaction mass was at all times acid to Congo red paper.

(B) PREPARATION OF THE PARTIAL AMIDE SALT 12.5 grams of the monoamide of hydrogenated tallow fatty acids and aminoethylethanolamine was dissolved in 125 grams of a 320 second Saybolt viscosity naphthenic base oil at a temperature of from 80° C. to 85° C. To this dissolved monoamide was then added 3.5 grams of glacial acetic acid to form the monoamide acetate salt. The entire solution was then emulsified with 107.5 cc. of water at a temperature of 85° C. to 90° C.

(C) PREPARATION OF THE SILICEOUS AMINO COMPOUND 152.5 grams of a 40° Bé. sodium silicate solution ($Na_2O:3.22SiO_2$) was added to 152.5 cc. of water. The monoamide acetate salt and the sodium silicate solution just prepared were then added to the silica gel of preparation A. Care was taken to keep the monoamide salt in excess at all times. The entire reaction mass was kept at a temperature of 63° C. The filtrate of the yellowish slurry that formed had a pH of 8.3. This pH was adjusted to 7.55 with approximately 1 gram of 96% sulfuric acid which was dissolved in 40 cc. of water. The adjusted slurry was digested at room temperature for 21 hours. No attempt was made to precipitate the isophthalic acid from its water soluble salt.

(D) RECOVERY OF THE SILICEOUS AMINO COMPOUND

The slurry was then heated with agitation to a temperature of 75° C. to 80° C. and filtered. The siliceous amino compound was washed four times with 1500 cc. of water each time, at a temperature of from 70° C. to 75° C. for 20 minutes and then filtered. The washed filter cake was dried in a forced air oven at a temperature of from 120° F. to 125° F. for 68 hours. The moisture content was 0.3%. Shrinkage during drying of the filter cake was 29.1%. The siliceous amino compound dried to hardened white particles which ground readily to a fine powder. The yield was 255 grams.

The bulking value of the siliceous amino compound was 63 cc./56 cc. for a 10 gram sample. A grease composed of 90% oil and 10% of the product of this example was made by simple agitation and utilizing a 320 second Saybolt viscosity naphthenic base oil had a Brookfield HV–B model viscosimeter viscosity of 8320 centipoises and upon homogenization at 7,000 to 7,500 pounds per square inch, the grease thickened to a viscosity of 42,800 centipoises and an A.S.T.M. grease penetration value of 375. There was no visible bleeding after 24 hours at room temperature.

*Example V*

The purpose of this example is to illustrate the use of the monoamide of ethylene diamine and hydrogenated tallow fatty acids in preparing a siliceous amino compound and the washing out of the water soluble salt of the aromatic acid without precipitating the aromatic acid.

(A) PREPARATION OF THE SILICA GEL 12.5 grams of isophthalic acid was added to 1,000 cc. of water. To this dispersion was then added 60 grams of a 40° Bé. sodium silicate ($Na_2O:3.22SiO_2$) solution. The clear solution was then diluted by the addition of 700 cc. of water and the entire solution was agitated while heating the clear sol to 80° C. Magnesium sulfate, 12.0 grams, was dissolved in 48 cc. of water and was added dropwise, at a temperature of 80° C., to the clear sol just prepared. Gel particles started forming upon the addition of the magnesium sulfate solution and the entire mixture was then diluted with 500 cc. of water and stirred while allowing the reaction mixture to cool to a temperature of 40° C., at which time, 6.25 grams of sodium fluosilicate was dissolved therein. Sodium silicate ($Na_2O:3.22SiO_2$), 190 grams of a 40° Bé. solution, was diluted with 190 cc. of water. To 215 cc. of water was added 38 grams of 96% sulfuric acid. The sodium silicate dilution and the sulfuric acid dilution were added at the same time dropwise to the entire reaction mixture. Care was taken during this addition to keep the sulfuric acid always in excess so that the reaction mass was at all times acid to Congo red paper. The reaction mass became milky as soon as this addition was commenced. This milkiness was due to a fine, voluminous precipitate of isophthalic acid. The entire mixture was stirred while heating to a temperature of 55° C.

(B) PREPARATION OF THE PARTIAL AMIDE ACID ADDITION SALT

The monoamide of ethylene diamine and hydrogenated tallow fatty acids, 12.5 grams, was dispersed in 125 grams of a 320 second Saybolt viscosity naphthenic base oil at a temperature of from 80° C. to 85° C. To this dispersion was then added 4.0 grams of glacial acetic acid.

(C) PREPARATION OF THE SILICEOUS AMINO COMPOUND

Sodium silicate ($Na_2O:3.22SiO_2$), 152.5 grams of a 40° Bé. solution, was diluted with 152.5 cc. of water. The partial amide salt previously prepared and this sodium silicate dilution just prepared, were then added at the same time to the silica gel previously prepared. The addition was commenced while the silica gel was at a temperature of 55° C. During the addition, care was taken to keep the partial amide salt in excess at all times. The partial amide salt was added over a period of 15 minutes and the sodium silicate dilution was added over a period of 30 minutes. The filtrate from a sample of the resultant slurry had a pH of 7.85. The pH of the filtrate from a sample of the slurry was adjusted to 7.55 by the addition to the slurry of 0.5 cc. of 96% sulfuric acid which had been diluted with 20 cc. of water. The reaction slurry was mixed for 15 minutes at a temperature of 60° C. to 63° C. and then digested for 18 hours at room temperature.

(D) RECOVERY OF THE SILICEOUS AMINO COMPOUND

The siliceous amino compound was recovered as in Example IV. The filter cake was dried at a temperature of from 120° F. to 135° F. for 68 hours. The yield was 257 grams of powdery chunks which ground readily to a fine powder.

*Example VI*

The purpose of this example is to illustrate the use of zinc isophthalate in preparing a siliceous amino compound, and the washing out of the water soluble salt without precipitating the aromatic acid.

(A) PREPARATION OF THE SILICA SOL

To 12.5 grams of isophthalic acid dispersed in 1,000 cc. of water was added 60 grams of a 40° Bé. sodium silicate ($Na_2O:3.22SiO_2$) solution diluted with 60 cc. of water. A clear sol was obtained at a temperature of 80° C. The sol was diluted with 1200 cc. of water at a temperature of 55° C. and 15.0 grams of zinc sulfate dissolved in 100 cc. of water was added thereto. The reaction mass became cloudy upon this addition. Sodium fluosilicate, 6.25 grams, was added to the entire reaction mass at a temperature of 45° C. Sodium silicate ($Na_2O:3.22SiO_2$), 190 grams of a 40° Bé. solution, was diluted with 190 cc. of water. 38 grams of 96% sulfuric acid was diluted in 215 cc. of water. The sulfuric acid and the sodium silicate solution were both added slowly in the manner of Example V to the silica sol.

(B) PREPARATION OF THE PARTIAL AMIDE SALT 12.5 grams of the monoamide of hydrogenated tallow fatty acids and aminoethylethanolamine was dispersed in 125 grams of a 320 second Saybolt viscosity naphthenic base oil at a temperature of from 65° C. to 70° C. To this dispersion was added 3.5 grams of glacial acetic acid and the entire mixture was emulsified with 107.5 cc. of water at a temperature of from 85° C. to 90° C.

(C) PREPARATION OF THE SILICEOUS AMINO COMPOUND

Sodium silicate ($Na_2O:3.22SiO_2$), 152.5 grams of a 40° Bé. solution was diluted with 152.5 cc. of water. The partial amide salt and the sodium silicate dilution just perpared were added at the same time to the silica sol of preparation A. During the addition, care was taken to keep the partial amide salt in excess at all times. The addition was accomplished at a temperature of 60° C. to 62° C. A yellowish slurry formed. The filtrate from a sample of the slurry had a pH of 5.9. The pH of the filtrate from a sample of the slurry was adjusted to 7.2 by the addition of 50% sodium hydroxide to the slurry. To a sample of the mother liquor was added 10% sulfuric acid and upon this addition, a white voluminous precipitate formed. This white precipitate was isophthalic acid. The siliceous amino compound was digested for 18 hours at room temperature without attempting to precipitate the aromatic acid therefrom, and washed and filtered as in Example V.

*Example VII*

The purpose of this example is to show that sodium fluosilicate need not necessarily be used in preparing a siliceous amino compound according to the process of this invention. The procedure of Example IV was repeated except that no sodium fluosilicate was used herein. A good product was obtained, but it was not as good a product as when a fluosilicate or fluosilicic acid was used.

In yet another variation of the procedure, sodium fluosilicate, 6.25 grams was used, and no digestion period was used in this variation. A good product was obtained.

*Example VIII*

The purpose of this example is to illustrate that barium isophthalate may be used in preparing a siliceous amino compound.

(A) PREPARATION OF THE SILICA GEL

Isophthalic acid, 12.5 grams, was dispersed in 1,000 cc. of water. Barium octahydrate, 15.1 grams, was dissolved in 270 cc. of hot water. The barium octahydrate solution was slowly added with agitation to the isophthalic acid dispersion at a temperature of 80° C. until a semi-transparent solution formed. This semi-transparent solution was diluted by the addition of 930 cc. of water. To this diluted solution was then dissolved 6.23 grams of sodium fluosilicate at a temperature of 55° C. The reaction mass was allowed to cool to a temperature of from 40° C. to 45° C. Sodium silicate

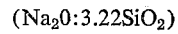

$$(Na_2O:3.22SiO_2)$$

250 grams of a 40° Bé. solution diluted with 250 cc. of water was prepared. Sulfuric acid, 43.7 grams of a 96% solution was diluted with 250 cc. of water. The sodium silicate dilution and the sulfuric acid dilution were both added at the same time to the entire reaction mass, care being taken to keep the acid in excess so that the mass was always acid to Congo red paper. Upon the addition of these two latter reactants, the mass became milky and the entire reaction mass was heated to a temperature of 65° C.

(B) PREPARATION OF THE PARTIAL AMIDE SALT

The partial amide salt was prepared in the manner of Example VI.

(C) PREPARATION OF THE SILICEOUS AMINO COMPOUND

The siliceous amino compound was prepared as in Example VI.

(D) RECOVERY OF THE SILICEOUS AMINO COMPOUND

A sample of the filtrate from the resultant slurry had a pH of 7.4. The slurry was mixed for one hour at a temperature from 60° C. to 63° C. and was then digested for 18 hours at room temperature. After digestion, the entire slurry was mixed while heating to a temperature of 80° C. and was then filtered. Upon the addition of 10% sulfuric acid to the filtrate, a white precipitate resulted. No attempt was made to treat the reaction slurry with sulfuric acid to precipitate isophthalic acid. Instead, the slurry was filtered, and washed, thereby washing out the water soluble salt of the aromatic acid. The resultant product was dried for 68 hours at a temperature of from 120° F. to 125° F. The yield was 267 grams.

*Example IX*

The purpose of this example is to illustrate that as little as 2.5% of isophthalic acid, based on the total weight of isophthalic acid used plus the calculated theoretical yield of the siliceous amino compound and free silica, may be advantageously used in preparing a siliceous amino compound.

The procedure of Example IV was substantially repeated. In this preparation, 3.1 grams of isophthalic acid dispersed in 250 cc. of water was used. Other variations were minor and did not critically affect the preparation. The bulking value of the product was 61 cc./56 cc. for a 10 gram sample.

Example X

The purpose of this example is to illustrate the use of different amines in preparing a siliceous amino compound.

(A) PREPARATION OF THE SILICA GEL 12.5 grams of isophthalic acid was added to 1,000 cc. of water. Sodium silicate ($Na_2O:3.22SiO_2$), 60 grams of a 40° Bé. solution was added thereto and the entire mixture was agitated and then diluted with 700 cc. of water and heated to 80° C. whereupon an additional 230 cc. of water was added. Magnesium sulfate, 12.0 grams dissolved in 48 cc. of water, was added dropwise to the above prepared mixture. The mixture was cooled to 25° C. and 6.25 grams of sodium fluosilicate was added thereto. Sodium silicate ($Na_2O:3.22SiO_2$), 190 grams of a 40° Bé. solution was added to 190 cc. of water. To 170 cc. of water was added 30 grams of 96% sulfuric acid. The sodium silicate solution and the sulfuric acid solution were added at the same time with agitation to the reaction mass. Care was taken to keep the acid in excess at all times.

(B) PREPARATION OF THE AMINE ACID ADDITION SALTS 25.0 grams of Armeen 12D was dissolved in 55 grams of the naphthenic base oil of Example II at a temperature of 45° C. to 50° C. Armeen 12D is composed of approximately 90% dodecyl amine, 9% tetradecyl amine, and 1% of octadecenyl amine. Glacial acetic acid, 8.75 grams, was added thereto. This clear amine acetate solution was then emulsified with 416 cc. of water.

(C) PREPARATION OF THE SILICEOUS AMINO COMPOUND 107.5 gram of a 40° Bé. sodium silicate ($Na_2O:3.22 SiO_2$)

solution was diluted with 107.5 cc. of water. The silica gel of preparation A was heated to 55° C. and the amine acetate solution and the sodium silicate dilution were added thereto at the same time. The amine acetate solution was kept in excess during the addition. The filtrate from a sample of the reaction slurry had a pH of 7.55 and 2 cc. of 10% sulfuric acid were added to the slurry to reduce the pH of the filtrate from a sample of the slurry to 7.3. The creamy slurry was agitated for 13 minutes at a temperature of from 60° C. to 63° C. The reaction mass was digested for 18 hours at room temperature.

(D) RECOVERY OF THE SILICEOUS AMINO COMPOUND

The siliceous amino compound was recovered substantially in the manner of Example IV. The filtration rate was 1 to 2½ minutes per 1,000 cc. of filtrate.

Among the other materials which were used in place of the amine used in this example were the monoamide of hydrogenated tallow fatty acids and diethylene triamine, cocoamine, the monoamide of hydrogenated tallow fatty acids and tetraethylene-pentamine, Armeen TD (essentially 30% hexadecyl, 25% octadecyl, 45% octadecenyl amines obtained from Armour & Co.), and the monoamide of "AB Acids" and aminoethylethanolamine. "AB Acids" are obtained from Archer-Daniels-Midland Co. and consist mainly of saturated $C_{20}$ and $C_{22}$ fatty acids with lesser amounts of $C_{14}$ to $C_{18}$ saturated fatty acids.

Example XI

The purpose of this example is to illustrate that 20% of isophthalic acid may be used as described previously. The preparation of Example IV was substantially repeated except that 25.0 grams of isophthalic acid was dispersed in 1,000 cc. of water. Variations in the procedure were minor and did not critically affect the preparation. The yield of product was 160 grams. The bulking value was 80/75 cc. for a 10 gram sample.

Example XII

The purpose of this example is to illustrate the preparation of a siliceous amino compound using stoichiometric amounts of sodium silicate ($Na_2O:2.5SiO_2$) and using a partial diamide.

(A) PREPARATION OF THE PARTIAL DIAMIDE SALT 9 grams of isophthalic acid and 61.5 grams of a 42° Bé. solution of sodium silicate ($Na_2O:2.5SiO_2$) were dissolved in 1500 cc. of water at a temperature of 70° C. until a clear solution was obtained. To this clear solution was then added 8.9 grams of magnesium sulfate ($MgSO_4.7H_2O$). Ammonium hydroxide (28.7% $NH_3$), 3.0 grams, and 11.9 grams of hydrofluosilicic acid (31.2% $H_2SiF_6$)

were added to 50 cc. of water. The resultant cloudy ammonium fluosilicate suspension was added, with agitation, to the solution previously prepared. 75 grams of the diamide of 2 moles of 2-ethylhexoic acid and 1 mole of diethylene triamine was added to 90 grams of kerosene at a temperature of from about 85° C. to about 90° C. Glacial acetic acid, 13.8 grams, was added to this kerosene-diamide mixture. The resultant diamide acetate was not completely soluble in the kerosene thus necessitating a continuous agitation of the mixture in order to maintain a fairly uniform suspension.

(B) PREPARATION OF THE SILICEOUS AMINO COMPOUND

The partial diamide acetate suspension was slowly added with agitation to the ammonium fluosilicate containing suspension. A brown dispersion formed. A sample of the filtrate from the reaction slurry had a pH of 5.5 and the pH of the filtrate from a sample of the reaction slurry was adjusted to 6.5 by the addition of 10 cc. of a 50% sodium hydroxide solution to the reaction slurry.

The reaction slurry was digested for 14 hours at room temperature.

(C) RECOVERY OF THE SILICEOUS AMINO COMPOUND

While the slurry was being digested, it separated into two layers and 1200 cc. of the lower aqueous layer was siphoned off. The siliceous amino compound was washed two times by agitating the reaction slurry with 200 cc. of water for 20 minutes at a temperature of from 70° C. to 75° C. After each wash, the lower aqueous layer was siphoned off. The washed siliceous amino compound was dried at a temperature of from 125° F. to 130° F. for 68 hours, the product ground readily to a fine powder and was then ground in a Raymond laboratory hammer mill.

The yield of product was 84 grams. The bulking value was 55 cc./51 cc. for a 10 gram sample. A siliceous amino compound prepared as above except that no fluosilicate or isophthalate was used, did not precipitate as fine a product as when a fluosilicate and an isophthalate was used. The non-fluosilicate and non-isophthalate preparation resulted in a product with larger particles. The bulking value of this later preparation was 50 cc./40 cc. for a 10 gram sample.

In addition, only a 69 gram yield of siliceous amino compound was obtained whereas when a fluosilicate and an isophthalate was used in the preparation, the yield was 84 grams. This indicates that the use of a fluosilicate and an isophthalate in preparing a siliceous amino compound improves the yield.

Example XIII

The purpose of this example is to illustrate the preparation of a siliceous amino compound wherein a quaternary ammonium compound and potassium fluosilicate are used. In addition, in this example, no solvent was used and no digestion period was used.

(A) PREPARATION OF THE SILICA SOL 12.5 grams of isophthalic acid and 60 grams of a 40°

Bé. solution of sodium silicate ($Na_2O:3.22SiO_2$) was dissolved in 1,000 cc. of water. 700 cc. of water was added to this solution and the entire solution was heated with agitation to a temperature of 80° C. The resultant clear silica sol was diluted with 500 cc. of water. 12 grams of magnesium sulfate ($MgSO_4.7H_2O$) was dissolved in 48 cc. of water and was slowly added to the silica sol while agitating said sol. The resultant cloudy slurry was cooled to a temperature of 55° C. and 6.1 grams of potassium fluosilicate was added thereto.

(B) PREPARATION OF THE SILICEOUS AMINO COMPOUND 134 grams of "Arquad 2HT" obtained from Armour & Co. and composed mainly of 30 hexadecyl quaternary ammonium chloride and 70% octadecyl quaternary ammonium chloride dissolved in 75% isopropyl alcohol, was added to the silica sol of preparation A with agitation. The entire slurry was heated to a temperature of 75° C. to 80° C.

210 grams of a 40° Bé. sodium silicate solution ($Na_2O:3.22SiO_2$)

was diluted with 210 cc. of water and was added over a period of one hour to the entire slurry. The resultant smooth buff colored slurry was agitated for one hour while being allowed to cool from a temperature of 85° C. to 65° C.

55 grams of hydrochloric acid (37% HCl) was diluted with 55 cc. of water and this dilution was added dropwise to the entire slurry. A sample of the filtrate of the reaction slurry had a pH of 4.7. Several drops of 10% sulfuric acid was added to this sample filtrate and no precipitate formed upon the addition thus indicating that the isophthalic acid had precipitated into and around the siliceous amino compound and free silica particles.

(C) RECOVERY OF THE SILICEOUS AMINO COMPOUND

The reaction slurry was heated to a temperature of from 70° C. to 75° C. with agitation and was filtered. The filter cake was washed four times, each time by adding 1500 cc. of water to the filter cake and agitating for 20 minutes at a temperature of 70° C. to 75° C. and then filtering. The washed filter cake was dried at a temperature of from 150° F. to 155° F. for 24 hours. The product was ground as in Example XII. The bulking value was 60 cc./56 cc. for a 10 gram sample. The yield was 184 grams of a fine powder.

The above preparation was repeated except that no fluosilicate and no isophthalate was added in the preparation. The product dried to 165 grams of a slightly gritty powder with a bulking value of 32 cc./30 cc. for a 10 gram sample.

*Example XIV*

The purpose of this example is to illustrate the preparation of a siliceous amino compound using a substituted oxazoline. The substituted oxazoline used was "Alkaterge T" which was obtained from Commercial Solvents Corporation.

(A) PREPARATION OF THE SILICA GEL 12.5 grams of isophthalic acid and 60 grams of a 40° Bé. sodium silicate solution ($Na_2O:3.22SiO_2$) was dissolved in 1,000 cc. of water. An additional 700 cc. of water was added thereto and the entire solution was heated to a temperature of 85° C. with agitation. The resultant clear silica sol was diluted with an additional 500 cc. of water.

12 grams of magnesium sulfate ($MgSO_4.7H_2O$) was dissolved in 48 cc. of water and was added slowly with agitation to the silica sol. The resultant cloudy slurry was cooled to a temperature of 55° C. and 6.25 grams of sodium fluosilicate was added thereto. 38 grams of 96% sulfuric acid was dissolved in 215 cc. of water. 190 grams of a 40° Bé. sodium silicate solution ($Na_2O:3.22SiO_2$)

was diluted with 190 cc. of water. The sodium silicate dilution and the sulfuric acid solution were added at the same time to the silica sol which was agitated during the addition. Care was taken during the addition to keep the acid always in excess so that the slurry was at all times acid to Congo red paper. The entire reaction slurry was heated to a temperature of 55° C.

(B) PREPARATION OF THE OXAZOLINE SALT 12.5 grams of Alkaterge T was dissolved in 250 grams of V M and P Naphtha at a temperature of from 70° C. to 75° C. To this Alkaterge T solution was added 3.5 grams of glacial acetic acid. The solution remained clear.

152.5 grams of a 40° Bé. sodium silicate solution ($Na_2O:3.22SiO_2$)

was diluted with 152.5 cc. of water.

(C) PREPARATION OF THE SILICEOUS AMINO COMPOUND

The oxazoline acetate salt and the sodium silicate dilution were added at the same time to the silica sol of preparation A, at a temperature of 55° C. During this addition, the reaction slurry of preparation A was agitated and the acetate salt was kept in excess.

A sample of the reaction slurry was filtered and the filtrate had a pH of 8.2. The filtrate from a sample of the reaction slurry was adjusted to a pH of 8.0 by the addition of 5 cc. of 10% sulfuric acid to the reaction slurry. The entire reaction mixture was allowed to digest for 19 hours whereupon the digested siliceous amino compound was agitated and 120 cc. of a 10% sulfuric acid was added thereto thereby precipitating isophthalic acid. A sample of the filtrate, obtained as before had a pH of 4.2 and upon addition of 10% sulfuric acid no precipitate formed.

(D) RECOVERY OF THE SILICEOUS AMINO COMPOUND

The slurry was agitated and heated to a temperature of 75° C. to 80° C. and was filtered. The siliceous amino compound was washed three times as in Example XIII and was then dried for 24 hours, at a temperature of from 150° F. to 155° F. The siliceous amino compound was ground in a Raymond laboratory hammer mill. A yield of 132 grams of a fine powder was obtained.

*Example XV*

The purpose of this example is to illustrate the use of an imidazoline compound in preparing a siliceous amino compound. The compound used was the imidazoline prepared from 2 moles of stearic acid and 1 mole of diethylene triamine.

(A) PREPARATION OF THE SILICA GEL

The silica gel was prepared as in Example IV.

(B) PREPARATION OF THE IMIDAZOLINE SALT 12.5 grams of the imidazoline was dissolved in 250 cc. of xylene at a temperature of 100° C. to 120° C. The solution was cooled to a temperature of 80° C. and 3.5 grams of glacial acetic acid was added thereto. A clear solution of imidazoline acetate was obtained.

(C) PREPARATION OF THE SILICEOUS AMINO COMPOUND

The siliceous amino compound was prepared as in Example XIV. The filtrate of a sample from the slurry had a pH of 8.8 and the filtrate of a sample from the reaction slurry was adjusted to a pH of 8.4 by the addition of 10 cc. of 10% sulfuric acid to the reaction slurry. The reaction slurry was then digested for 18½ hours. The digested siliceous amino compound slurry was agitated and 120 cc. of 10% sulfuric acid was added thereto. A sample of the filtrate obtained as before, had a pH of 4.4.

(D) RECOVERY OF THE SILICEOUS AMINO COMPOUND

The siliceous amino compound was heated with agitation to a temperature of 80° C. and filtered. The product was washed and recovered as in Example XIII. The siliceous amino compound was dried at a temperature of 125° F. to 130° F. for 68 hours. The product ground readily to 144 grams of a fine powder.

The siliceous amino compounds prepared by the process of the present invention are useful in grease compositions, to cure polyesters, as mold release agents, natural or synthetic rubber additives, stabilizers for halogen containing vinyl polymers, elevation of melting points, increase of hot viscosity of waxes and resins, thickeners for plastisols, plastigels and organosols, as a thermal insulating medium, wire drawing lubricants, flatting agents, as well as other uses.

As has been shown, the process using isophthalic acid or terephthalic acid or the water soluble salts thereof is a much improved process when compared to processes wherein said acids and said water soluble salts are not used. Using the process of this invention, a new composition of matter may be prepared by precipitating the water soluble salt as the acid before or after filtering and washing the final reaction slurry. As described previously, the water soluble salt of isophthalic acid or terephthalic acid may be washed out of the final reaction slurry. When this is done, while a new composition of matter is not obtained, the product is still an improved product when compared to a product not utilizing isophthalic acid or terephthalic acid or the water soluble salts thereof. The siliceous amino compounds prepared by the process of this invention, whether the water soluble salts of the aromatic acids are washed out or precipitated, are easier to grind to fine particle size and nonporous aggregate formation of the siliceous amino compound particles is greatly reduced. Using the process of this invention it is possible to reduce the time of filtration encountered in U.S. Patent No. 2,967,828, Ihde, January 10, 1961, even without necessarily using a substantially water insoluble organic material as disclosed in patent application Serial No. 836,086, filed August 26, 1959. Furthermore, the bleeding of a grease encountered when a siliceous amino compound was prepared using a fluosilicate salt or fluosilicic acid as described in co-pending application Serial No. 86,323, filed February 1, 1961, is greatly reduced.

Where the term aqueous is used in the claims, it encompasses not only those systems wherein the reaction medium is only water, but also those systems wherein the reaction media is water and one or more substantially water insoluble organic liquids.

Where the term silica is used in the claims, unless indicated otherwise, it encompasses both free and combined silica.

While this invention has been described in terms of certain preferred embodiments and illustrated by means of specific examples, these are illustrative only and are not to be construed as limited except as set forth in the following claims.

Having described my invention, what I claim as new and desire to secure by Letters Patent is:

1. In a process for preparing a siliceous amino compound in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates, and thereafter recovering and drying the resultant siliceous amino compound, the improvement which comprises introducing at least one water-soluble aromatic compound selected from the class consisting of water-soluble salts of isophthalic acid and water-soluble salts of terephthalic acid, said aromatic compound being introduced at a point in time prior to the drying of said siliceous amino compound, (a) with the proviso that when said water-soluble aromatic compound is present during formation of said siliceous amino compound and the corresponding aromatic acid of said water-soluble aromatic compound does not remain in said siliceous amino compound, maintaining the pH of said aqueous system from about 7 to about 9.5 during the formation of said siliceous amino compound and thereafter washing out said water-soluble aromatic compound, (b) with the proviso that when said water-soluble aromatic compound is present during formation of said siliceous amino compound and the corresponding aromatic acid of said water-soluble aromatic compound remains in said siliceous amino compound, maintaining the pH of said aqueous system from 7 to about 9.5 during the formation of said siliceous amino compound and thereafter lowering said pH to from just below about 7 to about 3.0 whereupon the corresponding aromatic acid of said water-soluble aromatic compound precipitates in and around the particles of siliceous amino compound, and (c) with the proviso that when said siliceous amino compound is formed in the absence of said water-soluble aromatic compound, maintaining the pH of said aqueous system from about 6.5 to about 9.5 during the formation of said siliceous amino compound and thereafter introducing said water-soluble aromatic compound and adjusting the pH of the system to from just below about 7 to about 3.0 whereupon the corresponding aromatic acid of said water-soluble aromatic compound precipitates in and around the particles of siliceous amino compound.

2. In a process for preparing a siliceous amino compound in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates, and thereafter recovering and drying the resultant siliceous amino compound, the improvement which comprises providing for the presence of at least one water-soluble aromatic compound selected from the class consisting of water-soluble salts of isophthalic acid and water-soluble salts of terephthalic acid in said aqueous system during the formation of said siliceous amino compound, maintaining the pH of said aqueous system from about 7 to about 9.5 during the formation of said siliceous amino compound and thereafter washing out said water-soluble aromatic compound.

3. In a process for preparing a siliceous amino compound in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates and thereafter recovering and drying the resultant siliceous amino compound, the improvement which comprises providing for the presence of at least one water-soluble aromatic compound selected from the class consisting of water soluble salts of isophthalic acid and water-soluble salts of terephthalic acid in said aqueous system during the formation of said siliceous amino compound, maintaining the pH of said aqueous system from about 7 to about 9.5 during the formation of said siliceous amino compound and thereafter lowering said pH to from just about below 7 to about 3.0 whereupon the corresponding aromatic acid of said water-soluble aromatic compound precipitates in and around the particles of siliceous amino compound.

4. In a process for preparing a siliceous amino compound in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates, and thereafter recovering and drying the resultant siliceous amino compound, the improvement which comprises introducing into said aqueous system at least one water-soluble aromatic compound selected from the class consisting of water-soluble salts of isophthalic acid and water-soluble salts of terephthalic acid after the formation of said siliceous amino compound and thereafter adjusting the pH of said aqueous system to from just below 7 to about 3.0 whereupon the corresponding aromatic acid of said water-soluble aromatic compound precipitates in and around the particles of siliceous amino compound, the pH of said aqueous system being maintained at from about 6.5 to about 9.5 during the formation of said siliceous amino compound.

5. A process according to claim 1, wherein there is present a silicate derivative selected from the class consisting of fluosilicic acid, and water soluble fluosilicate salts, said silicate derivative being present at the time of formation of the siliceous amino compound.

6. A process according to claim 1, wherein said material and said water soluble silicate salts are reacted in the presence of a substantially water insoluble organic compound, said organic compound being liquid at the operating temperatures of the process.

7. A process according to claim 1, wherein said aromatic compound is magnesium isophthalate.

8. A process according to claim 1, wherein said aromatic compound is zinc isophthalate.

9. A process according to claim 1, wherein said corresponding aromatic acid is terephthalic acid.

10. A process according to claim 1, wherein said corresponding aromatic acid is isophthalic acid.

11. A process according to claim 1, wherein said aromatic compound is magnesium terephthalate.

12. A process according to claim 1, wherein said aromatic compound is zinc terephthalate.

13. A process according to claim 1, wherein said water soluble silicate salt is present in greater than stoichiometric amounts with regard to said material.

14. A process according to claim 13, wherein the excess over the stoichiometric amount of said water soluble silicate salt is converted to free silica.

15. A process according to claim 1, wherein said water soluble silicate salt is present in stoichiometric amounts with regard to said material.

16. A process according to claim 1 in which said water-soluble aromatic compound is introduced in a molar amount equivalent to the molar amount of said corresponding aromatic acid, said corresponding aromatic acid being equal in weight up to about 20% by weight based on the total weights of said aromatic acid and the total theoretical yield of siliceous amino compound.

17. The process of claim 1 in which free silica is present during formation of said siliceous amino compound.

18. A process according to claim 17, wherein said material and said water soluble silicate salts are reacted in the presence of a substantially water insoluble organic compound, said organic compound being liquid at the operating temperatures of the process.

19. A process according to claim 17, wherein there is present a silicate derivative selected from the class consisting of fluosilicic acid, and water soluble fluosilicate salts, said silicate derivative being present at the time of formation of the siliceous amino compound.

20. A process according to claim 17, wherein said material and said water soluble silicate salts are reacted in the presence of sufficient free silica so that there is present in the resulting product up to about 95% by weight of silica.

21. The process of claim 1 in which free silica containing the corresponding aromatic acid of said water-soluble aromatic compound is present during the formation of said siliceous amino compound, said aromatic acid being converted to said water-soluble aromatic compound during the formation of said siliceous amino compound.

22. A process according to claim 20 in which said water-soluble aromatic compound is introduced in a molar amount equivalent to the molar amount of said corresponding aromatic acid, said corresponding aromatic acid being equal in weight to about 20% by weight based on the weights of aromatic acid and the total theoretical yield of siliceous amino compound.

23. A composition of matter prepared in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates and thereafter recovering and drying the resultant siliceous amino compound, in which the improvement comprises introducing at least one water-soluble aromatic compound selected from the class consisting of water-soluble salts of isophthalic acid and water-soluble salts of terephthalic acid,
 (a) with the proviso that when said water-soluble aromatic compound is present during formation of said siliceous amino compound, maintaining the pH of said aqueous system from about 7 to about 9.5 during the formation of said siliceous amino compound and thereafter lowering said pH to from just below about 7 to about 3.0 whereupon the corresponding aromatic acid of said water-soluble aromatic compound precipitates in and around the particles of siliceous amino compound, and
 (b) with the proviso that when said siliceous amino compound is formed in the absence of said water-soluble aromatic compound, maintaining the pH of said aqueous system from about 6.5 to about 9.5 during the formation of said siliceous amino compound and thereafter introducing said water-soluble aromatic compound and adjusting the pH of the system to from just below about 7 to about 3.0 whereupon the corresponding aromatic acid of said water-soluble aromatic compound precipitates in and around the particles of siliceous amino compound.

24. A composition of matter according to claim 23 wherein there is present up to about 95% by weight of silica.

References Cited in the file of this patent
UNITED STATES PATENTS
2,967,828    Ihde _____ Jan. 10, 1961